United States Patent [19]
Dubot et al.

[11] 3,961,183
[45] June 1, 1976

[54] LIGHT-RESPONSIVE ELECTRIC SWITCH

[75] Inventors: Guy Dubot; Jacques Lemercier, both of Saverne (Bas-Rhine), France

[73] Assignee: Fabrique d'Horlogerie la Vedette S.A., Saverne, France

[22] Filed: Feb. 3, 1975

[21] Appl. No.: 546,751

[30] Foreign Application Priority Data
Feb. 8, 1974   France .................................. 74.04759

[52] U.S. Cl. ..................... 250/214 R; 250/214 AL; 250/239; 307/117; 315/159; 317/130 R
[51] Int. Cl.² .................. H01J 39/12; H05B 37/02; H01H 47/24
[58] Field of Search ......... 250/206, 214 R, 214 AL, 250/239; 315/149, 159; 307/117, 141, 157; 317/124, 130, 141 R

[56] References Cited
UNITED STATES PATENTS 3,207,932  9/1965  Tongret ........................ 307/117 X
3,496,422  2/1970  Horowitz ....................... 250/239 X
3,629,649  12/1971 Del Zotto ......................... 315/159

*Primary Examiner*—Alfred E. Smith
*Assistant Examiner*—E. R. LaRoche
*Attorney, Agent, or Firm*—Young & Thompson

[57] ABSTRACT

A light-responsive electric switch is composed on the one hand by an electronic circuit constituted, in the case of direct-current supply, by a voltage divider comprising a fixed resistor and a variable resistor forming the photo-conductive cell, by four transistors which are blocked or rendered conductive according to the illumination of the photo-conductive cell, by a change-over switch transmitting the voltage to another transistor into the collector circuit of which a motor is connected, and on the other hand by an electro-mechanical device constituted by a bistable trigger circuit controlling the motor, by a step-down gearing meshing with a pinion fixed on the shaft of this motor, by cams fast with the shaft of the final pinion of the step-down gearing and by one or more contacts which close or interrupt one or more lighting circuits.

5 Claims, 7 Drawing Figures

LIGHT-RESPONSIVE ELECTRIC SWITCH

INTRODUCTION AND BACKGROUND OF THE INVENTION

The present invention relates to instruments known as light-responsive electric switches which as a function of the illumination permit of closing or opening one or more circuits for the control of lighting, especially public street lighting, according to the time and the momentary degree of illumination.

These instruments, in order to fulfil their task, namely the obtaining of energy economy, must be extremely reliable, precise and economical, while avoiding any untimely putting into or out of action, that is lighting or extinguishing, of the lighting system in the case of rapid variations of illumination caused for example by the headlights of automobile vehicles or by other instantaneous and/or transient causes.

The apparatus according to the invention permits of solving this problem in a particularly interesting manner, by the fact that it is of simple construction, small bulk and in that it offers numerous possibilities of combinations, by virtue of which multiple automatic systems are realisable.

BRIEF SUMMARY OF THE INVENTION

To this end the light-responsive electric switch according to the invention is equipped with a photo-conductive cell inserted into the control bridge of an amplifier stage, at the output of which a bistable trigger circuit, on each triggering action, controls a direct-current motor which through the intermediary of a reduction gearing operates one or more contacts which close or interrupt the lighting circuit or circuits according to the illumination.

FURTHER DESCRIPTION AND ADVANTAGES OF THE INVENTION

According to another characteristic of the invention the motor, controlled by the bistable trigger circuit, likewise operates a change-over contact which cuts off its own feed at the end of each cycle, the duration of which determines the delay in the making and breaking of the utilisation circuit or circuits, this delay, which avoids all untimely extinguishing or lighting, being easily obtained and regulable by virtue of the step-down ratio of the gearing.

According to another characteristic of the invention the photo-conductive cell can be mounted either directly in the sealed apparatus, or in articulated and orientable manner in a sealed antenna, in which case the photo-conductive cell is electrically connected with the actual light-responsive switch.

By way of variant the light-responsive switch according to the invention can likewise be combined with a timing switch which can be equipped with a weekly or other programme, thus producing an apparatus which permits of totally or partially interrupting one or more lighting circuits during the desired hours and/or of cutting or reducing the night time lighting on certain days of the week.

The following description relates to various forms of embodiment of the invention which are given by way of non-limitative examples and explained with reference to the accompanying drawings.

BRIEF DESCRIPTION OF THE VIEWS IN THE DRAWINGS

FIGS. 1 and 1a represent diagrammatically the electronic circuits of light-responsive switches according to the invention fed respectively with alternating-current voltage at 220 V — 50 Hz, and by direct-current voltage of 12 V., FIGS. 2a and 2b represent diagrammatically, respectively in elevation and plan view, a form of embodiment of the control of the change-over contact supplying the motor and the contacts of the lighting circuits, FIGS. 3 and 4 show diagrammatically the installation of the light-responsive switch respectively with incorporated cell and with cell mounted in a separate orientable antenna, FIG. 5 illustrates diagrammatically the combination of the light-responsive switch according to the invention with a timing switch.

DETAILED DESCRIPTION OF THE PREFERRED EMBODIMENTS

Figure 1:
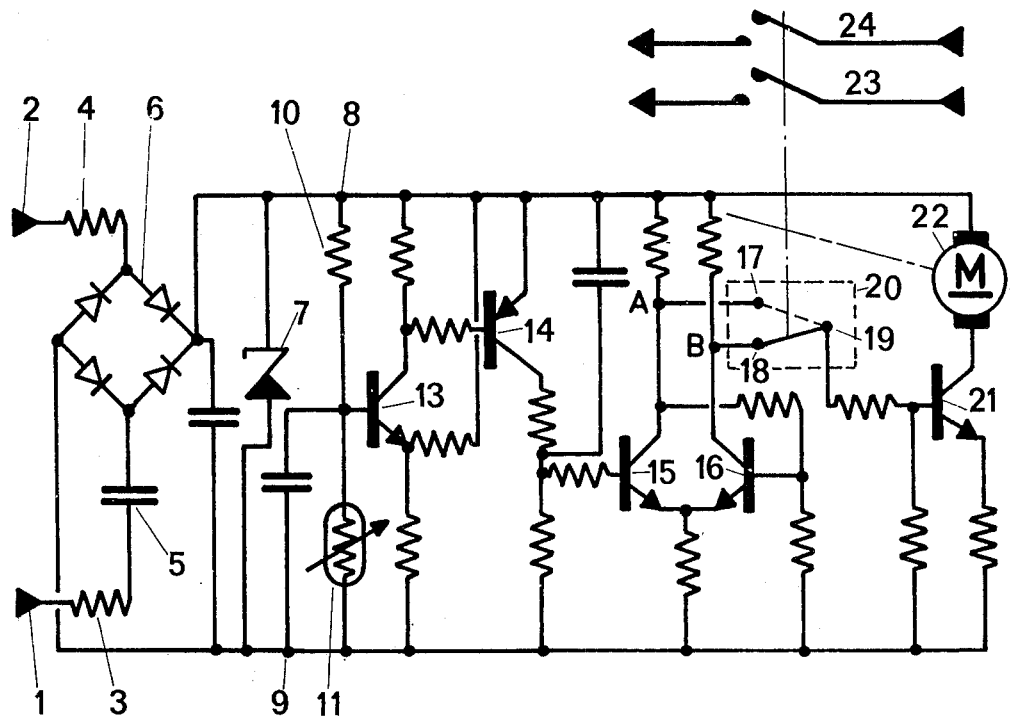

As represented by way of example in FIG. 1 of the Drawings, the electronic circuit of the light-responsive switch, supplied at the inputs 1, 2 by a voltage of 220 V, 50 Hz, is constituted by two resistors 3, 4 and a capacitor 5 intended to reduce the voltage to a value of 12 V, this voltage being rectified by the full-wave rectifier 6 and stabilised by means of a Zener diode 7, by a voltage divider to the terminals 8, 9 of which the rectified voltage is applied, which divider comprises on the one hand a fixed resistor 10 and on the other a variable resistor 11 forming the photo-conductive cell the ohmic value of which is in inverse proportion to its illumination, by four transistors 13 to 16 and by a change-over switch 20 which transmits the voltage to another transistor 21 into the collector circuit of which the motor 22 is connected.

Figure 1A:
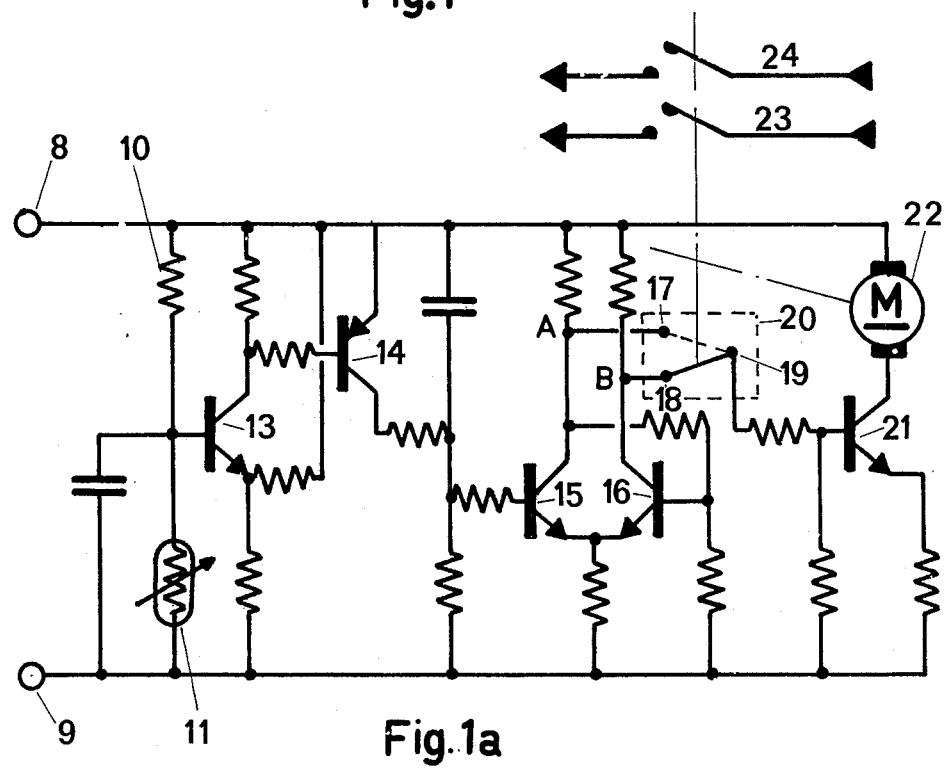

As variant, and as represented in FIG. 1a, the electronic circuit as described above with reference to FIG. 1 can equally be supplied by a direct-current voltage of 6 V, 9 V, etc. applied directly to the terminals 8 and 9.

Figure 2A:
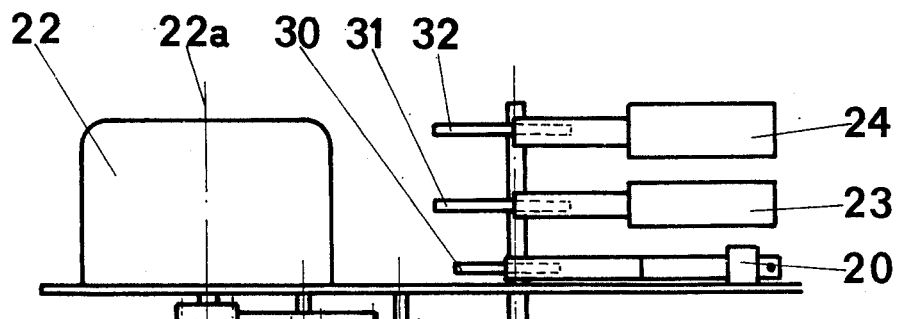
Figure 2B:
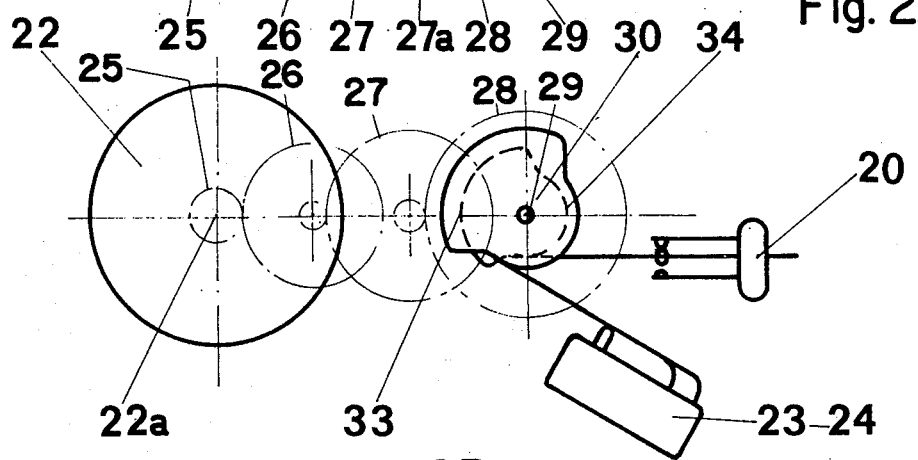

As shown in FIGS. 2a and 2b, the motor 22 is equipped on its shaft 22a with a pinion 25 meshing with the reduction gearing 26, 27, 27a, 28. The gear wheel 28 is fast with a shaft 29 on which the cams 30, 31 and 32 are fixed which respectively control the change-over contact 20 and the contacts 23, 24.

The operation of the device as described is as follows:

As the photo-conductive cell is less illuminated, its resistance increases which has the effect of increasing the potential difference between the base and the emitter of the transistor 13, until the moment when the transistor 13 is unblocked and becomes conductive. The current flowing between emitter and collector is then amplified for the transistor 14 and consequently the transistor 15 becomes conductive while the transistor 16 is blocked. The voltage at the point B therefore becomes maximum and is applied to the base of the transistor 21 through the intermediary of the points 18 and 19 of the change-over switch 20. The motor 22, connected into the collector circuit of the transistor 21, is then fed which has the effect that the pinion 25, through the intermediary of the reduction gearing 26 and 27, drives the wheel 28 fast with the shaft 29 carrying the cams 30, 31 and 32 which are positioned so that the contacts 23 and 24 are switched before the contact 20. In the course of rotation the cams 31 and 32 close the lighting circuits, then the cam 30, by one of its lobes 33, actuates the switch 20 and switches it over to the points 17 and 19 of the change-over switch 20. The supply of the motor is then cut off.

Conversely when the photo-conductive cell 11 is progressively illuminated its resistance diminishes which has the effect of blocking the transistor 13. Therefore the transistor 14 is likewise blocked which involves the change of state of the transistors 15 and 16, that is the transistor 16 becomes conductive and the transistor 15 is blocked. The voltage at the point A increases and is applied to the base of the transistor 21 through the intermediary of the points 17 and 19 of the change-over switch 20. The motor 22 is then supplied and will again drive the cam shaft until a hollow 34 of the cam 30 switches over the change-over switch 20 to the points 18 and 19. Meanwhile the cams 31 and 32 will have interrupted the lighting circuits.

The speed of the motor, the gear ratio and the number of lobes of the cams determine the duration of the delay. According to the applications, this duration can easily be modified by changing one or more of these factors.

Figures 3, 4, 5:
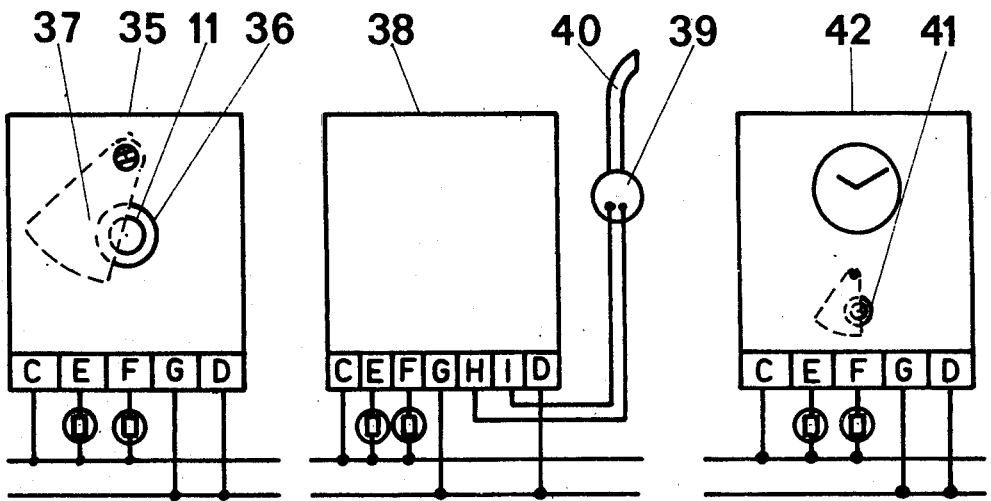

By way of example FIG. 3 represents the installation of a light-responsive switch according to the present invention.

The electronic circuit with its light-sensitive resistor, the motor with its gearing and the contacts are incorporated in the sealed casing 35 which can be of standardised format. The light-sensitive resistor 11 E., F the illumination through an aperture 36 of the opaque casing 35. For the regulation of the operating threshold of the light-responsive switch, the casing 35 is equipped for example with an adjustable shutter 37 which permits of modifying the illumination area of the photo-conductive cell 11.

Mains voltage or a source of direct-current voltage is connected to the terminals C and D of the light-responsive switch. The utilisation circuit or circuits is or are connected to the terminals E. F. and G.

Another example of installation of a light-responsive switch according to the invention is represented in FIG. 4. In this case the light sensitive resistor, mounted separately from the casing on a fixed support 39 to which the orientable antenna 40 is connected, is connected by two wires to the terminals H and I of the actual switch 38. This solution permits of placing the antenna 40 at an appropriate location and of adjusting its orientation to obtain the desired actuation threshold, while avoiding possible troublesome light sources.

According to another characteristic of the invention the light-responsive switch with incorporated or separate light-sensitive resistor can also be combined, as represented by way of example in FIG. 5, with a timing switch. In this embodiment the electronic circuit with its light-sensitive resistor 41, the motor with its gearing and the various contacts are contained in the casing 42 in which a timing switch is also incorporated which can be equipped on the one hand with one, two or more circuits which thus permit, by the fact that each circuit is controlled by an independent programme, of nocturnal interruptions of the lighting system at different hours for each of the lighting circuits, and on the other hand wtih a weekly programme circuit by virtue of which it will be possible to modify the daily programme of each of the lighting circuits on certain days of the week.

The invention is not of course limited to the examples of embodiment as described and represented, and various modifications of detail can be effected therein without departing from the spirit thereof.

What is claimed is:

1. A light-responsive electric switch, comprising an electronic circuit, means to supply direct current to said circuit, said circuit comprising a voltage divider comprising a fixed resistor and a variable resistor forming a photo-conductive cell, transistors which are blocked or rendered conductive according to the illumination of the photo-conductive cell, a further transistor, a changeover switch transmitting voltage from the first-mentioned transistors to said further transistor, said further transistor having a collector circuit, a motor connected in the collector circuit of said further transistor, said motor having an output shaft having a pinion fixed thereon, step-down gearing meshing with said pinion, cam means rotatable with the final pinion of said step-down gearing, and at least one contact engageable with said cam means for opening and closing at least one lighting circuit.

2. A switch as claimed in claim 1, said means to supply direct current to said circuit comprising an alternating current supply, two resistors and a capacitor to reduce the voltage of said alternating current supply, a rectifier for rectifying the current from said two resistors and capacitor, and a Zener diode to stabilize the current from said rectifier.

3. A switch as claimed in claim 1, and a casing housing said switch, said photoelectric cell being fixed directly in said casing.

4. A switch as claimed in claim 1, and a casing in which said switch is housed, and an orientable antenna articulated to said casing and electrically connected with said circuit.

5. A switch as claimed in claim 1, and a casing in which said switch is housed, and a timing switch for said circuit mounted in said housing.

* * * * *